United States Patent [19]

Ackerman

[11] 3,856,853

[45] Dec. 24, 1974

[54] IODINATED 5-SUBSTITUTED-1,3-BENZENEDIACRYLIC AND DIPROPIONIC ACIDS

[75] Inventor: James H. Ackerman, Bethleham, N.Y.

[73] Assignee: Sterling Drug Inc., New York, N.Y.

[22] Filed: Mar. 29, 1971

[21] Appl. No.: 129,140

Related U.S. Application Data

[62] Division of Ser. No. 683,455, Nov. 16, 1967, Pat. No. 3,647,864.

[52] U.S. Cl.... 260/518 A, 260/298.88, 260/326.41, 260/47, 260/521 H, 260/521 N, 424/5
[51] Int. Cl.......................................... C07c 103/32
[58] Field of Search........ 260/518 A, 479 R, 521 H, 260/521 N

[56] References Cited
UNITED STATES PATENTS 3,128,301  4/1964  Larsen et al. .................. 260/518 A Primary Examiner—Lorraine A. Weinberger
Assistant Examiner—L. A. Thaxton
Attorney, Agent, or Firm—B. Woodrow Wyatt; Thomas L. Johnson

[57] ABSTRACT

5-Amino- or 5-hydroxy-2,4,6-triiodo-1,3-benzenediacrylic and -dipropionic acids, optionally substituted by lower-alkyl or phenyl in the $\alpha$- and $\alpha'$-positions, are prepared by iodination of the appropriate 5-amino- or 5-hydroxy-1,3-benzenediacrylic or -dipropionic acids; and the 5-amino and 5-hydroxy groups are further substituted by acyl and alkyl groups. The iodinated compounds are useful as intravenous cholecystographic agents.

13 Claims, No Drawings

IODINATED 5-SUBSTITUTED-1,3-BENZENEDIACRYLIC AND DIPROPIONIC ACIDS

This application is a division of my copending application Ser. No. 683,455, filed Nov. 16, 1967, now U.S. Pat. No. 3,647,864.

This invention relates to iodinated arylaliphatic acids and their preparation, and more particularly is concerned with 5-R-2,4,6-triiodo-1,3-benzenediacrylic and -dipropionic acids, and the preparation thereof, wherein R is an amino or hydroxy group, optionally substituted by alkyl or acyl groups. The invention is also concerned with intermediates in the preparation of said iodinated acids.

The final products of the invention are of the formula

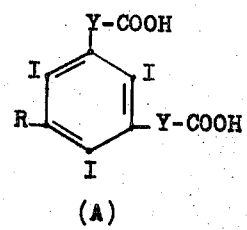

(A)

wherein R is $H_2N$, (lower-alkanoyl)NH, (lower-alkanoyl)N(lower-alkyl), succinimido, glutarimido, (carboxy-lower-alkanoyl)NH, (carboxy-lower-alkanoyl)N(lower-alkyl), (lower-alkyl)$_2$NCH=N, HO, (lower-alkanoyl)O or (lower-alkyl)O; and Y is —CH=C(R')— or —CH$_2$-CH(R')—, wherein R' is hydrogen, lower-alkyl or phenyl.

In the foregoing definitions of R and R', the term "lower-alkyl" stands for alkyl groups having -benzenedipropionic one to six carbon atoms, thus including, for example, methyl, ethyl, propyl, isopropyl, butyl, isobutyl, pentyl, hexyl, and the like.

In the foregoing definitions of R, the term "lower-alkanoyl" stands for alkanoyl groups having from one to six carbon atoms, thus including, for example, formyl, acetyl, propionyl, butyryl, isobutyryl, valeryl, caproyl, and the like.

The compounds of the invention are prepared by way of the reaction sequence set forth in the following flow sheet:

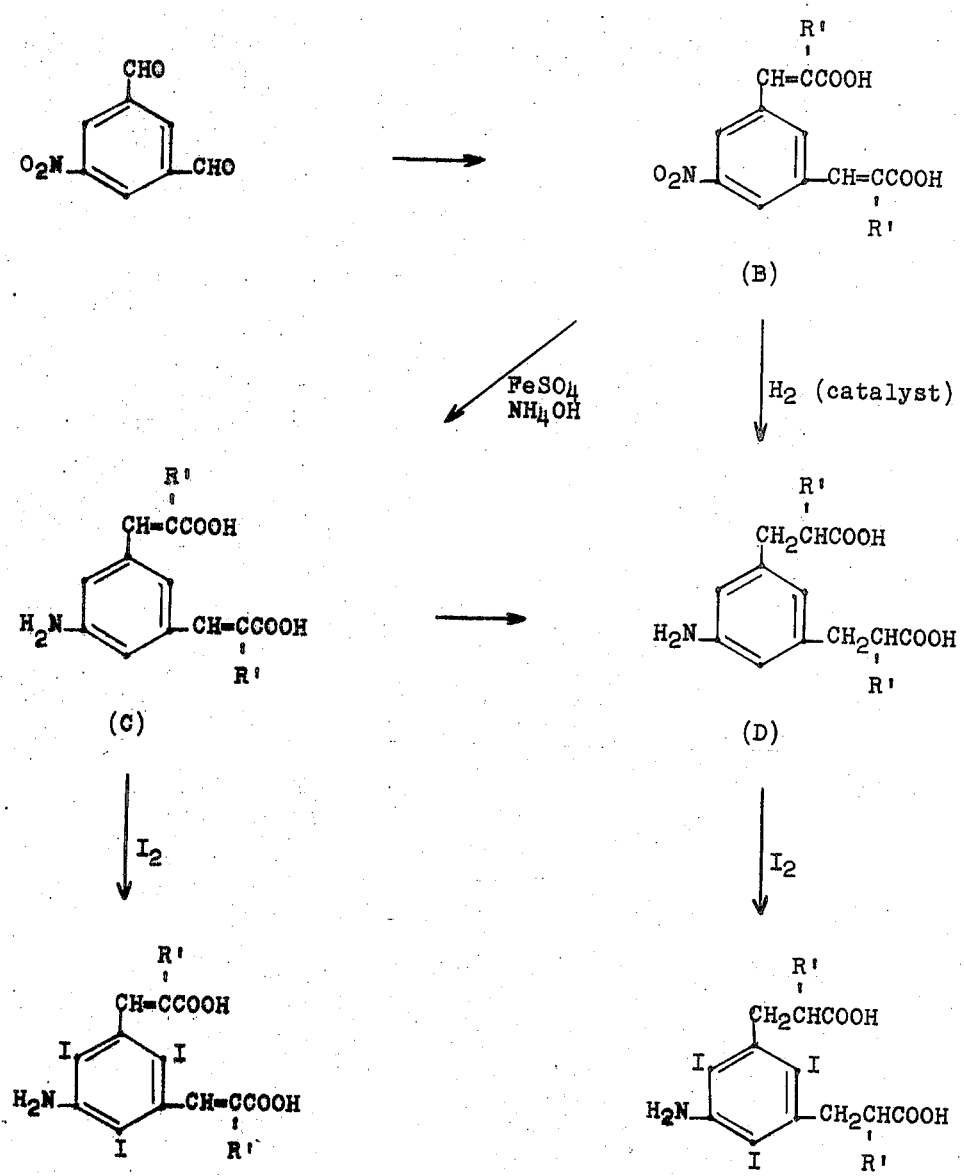

The starting material is 5-nitroisophthalaldehyde which is subjected to a Perkin, Doebner or Knoevenagal type reaction using the appropriate acid anhydride or malonic acid to afford a 5-nitro-1,3-benzenediacrylic acid (B). The latter can be either selectively reduced, for example, with ferrous sulfate in ammonium hydroxide to give a 5-amino-1,3-benzenediacrylic acid (C), or further reduced in the side-chains, for example, by catalytic hydrogenation to give a 5-amino-1,3-benzenedipropionic acid (D). The amino compounds (C) or (D) can then be iodinated to give, respectively, a 5-amino-2,4,6-triido-1,3-benzenediacrylic acid [(A); R is $H_2N$, Y is $-CH=C(R')-$] or a 5-amino-2,4,6-triiodo-1,3-bennzenedipropionic acid [(A); R is $H_2N$, Y is $-CH_2CH(R')-$]. The iodination can be effected by any source of elementary iodine. A preferred source of iodine is iodine monochloride or iodine monochloride-potassium chloride complex. The iodination is carried out in aqueous medium and takes place at room temperature or below, although heating may be used to drive the reaction to completion.

The remaining compounds within the scope of formula (A) are prepared by various transformations of the functional group in the 5-position, as follows:

The compounds of formula (A) where R is (lower-alkanoyl)NH are prepared by acylation of the compounds of formula (A) where R is $H_2N$ with the appropriate alkanoic acid anhydride or alkanoic acid halide.

The compounds of formula (A) wherein R is (lower-alkanoyl)N(lower-alkyl) are prepared by alkylation of compounds of formula (A) wherein R is (lower-alkanoyl)NH with the appropriate lower-alkyl sulfate or halide.

The compounds of formula (A) wherein R is succinimido or glutarimido are prepared by reacting the compounds of formula (A) wherein R is $H_2N$ with succinic anhydride or glutaric anhydride, respectively, in the presence of a strong acid catalyst, for example, sulfuric acid or phosphoric acid.

The compounds of formula (A) wherein R is (carboxy-lower-alkanoyl)NH are prepared by alkaline hydyrolysis of the compounds of formula (A) wherein R is succinimido or glutarimido; or by reacting a compound of formula (A) wherein R is $H_2N$ with a dibasic acid half ester half acid chloride, followed by mild alkaline hydrolysis of the resulting carbalkoxy-lower-alkanoyl compound.

The compounds of formula (A) wherein R is (carboxy-lower-alkanoyl)N(lower-alkyl) are prepared by alkylation of compounds of formula (A) wherein R is (carboxy-lower-alkanoyl)NH with the appropriate lower-alkyl sulfate or halide.

The compounds of formula (A) wherein R is (lower-alkyl)$_2$NCH=N are prepared by reacting the compounds of formula (A) wherein R is $H_2N$ with a di-lower-alkylformamide in the presence of phosphorous oxychloride.

The compounds of formula (A) wherein R is HO are prepared by diazotization and hydrolysis of a compound of formula (C) or (D) followed by iodination.

The compounds of formula (A) wherein R is (lower-alkanoyl)O or (lower-alkyl)O are prepared by esterification or etherification, respectively, of the compounds of formula (A) wherein R is HO, that is, by reacting the latter with an acid anhydride or acid halide, or with a lower-alkyl sulfate in the presence of a base.

The compounds of formula (B) can be obtained and isolated in geometric stereoisomeric forms, trans,trans, cis,trans, and cis,cis isomers. The isomers can be carried through the subsequent reactions separately or in admixture, whichever is desired. Moreover, the compounds of formula (A) wherein Y is $CH_2CH(R')$, R' being lower-alkyl or phenyl, possess two asymmetric centers and thus can, if desired, be separated by physical means into two dl-pairs.

The reaction of 5-nitroisophthalaldehyde with malonic acid leads, in addition to 5-nitro-1,3-benzenediacrylic acid as the major product, to a by-product, 3-(2-carboxy-1-hydroxyethyl)-5-nitrocinnamic acid, in about 10 % yield, or, if a lower-alkanol is present in the reaction medium, to 3-(2-carboxy-1-lower-alkoxyethyl)-5-nitrocinnamic acid. These byproducts possess bacteriostatic and fungistatic properties and are within the purview of the invention.

A further aspect of the invention relates to compounds of the formula

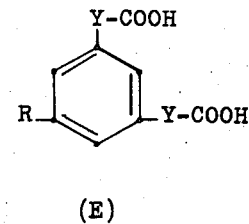

(E)

wherein R is $O_2N$, $H_2N$, (lower-alkanoyl)NH or HO; and Y is $-CH=C(R')-$ or $-CH_2CH(R')-$, wherein R' is lower-alkyl or phenyl, Y being limited to $-CH=C(R')-$ when R is $O_2N$. The compounds of formula (E) are primarily useful as intermediates in the preparation of compounds of formula (A), although they also possess bacteriostatic and fungistatic activities.

The structures of the compounds of the invention were determined by the modes of synthesis, by elementary analysis and by neutral equivalent determinations. The course of the reactions was followed by thin-layer chromatography.

The compounds of the invention, being carboxylic acids, can be obtained in the form of salts derived from inorganic bases or organic amines. The compounds of formula A being dibasic acids can form mono- or di-salts. Preferred salts are those which are pharmaceutically acceptable, for example, the sodium, magnesium, calcium and N-methylglucamine salts; although all salts are useful either as characterizing derivatives or as intermediates in the purification of the acids. The salt forms of the compounds of the invention are considered the full equivalents of the free acids claimed herein, and thus are part of the same inventive concept.

The compounds of the invention having the formula (A) in the form of water-soluble, pharmaceutically acceptable salts are useful as intravenous X-ray contrast media for visualization of the gallbladder (cholecystography). The compounds of primary interest as cholecystographic agents of very low toxicity, having $LD_{50}$ values in the range 1,500–7,000 mg./kg., are those of formula (A) wherein R is other than primary amino ($H_2N$). The compounds of formula (A) wherein R is primary amino ($H_2N$) have lower $LD_{50}$ values than the substituted amino derivatives and hence their primary usefulness is as intermediates or as oral cholecystographic agents.

The compounds were tested for their cholecystographic efficacy by standard procedure as follows: The test compound was injected intravenously in the form of an aqueous solution of the sodium or N-methylglucamine salt to cats. Each cat was X-rayed at hourly intervals and the roentgenograms examined and evaluated. The density of the gallbladder shadows was interpreted in accordance with a numerical scoring plan designed as the Cholecystographic Index (CI), a measure of the efficiency of the test compound, viz.: 0 (none), 1 (poor), 2 (fair), 3 (good), 4 (excellent) [see J. O. Hoppe, J. Am. Pharm. Assoc., Sci, Ed. 48, 368–79 (1959)].

The compounds of the invention are prepared for cholecystographic use by dissolving a pharmaceutically acceptable salt form in sterile aqueous medium suitable for intravenous injection.

The following examples will further illustrate the invention without the latter being limited thereby.

EXAMPLE 1 trans,trans-5-Nitro-1,3-benzenediacrylic acid [Formula B; R' is H, trans,trans isomer]

A solution of 35.8 g. (0.200 mole) of 5-nitroisophthalaldehyde, 50 g. (0.48 mole) of malonic acids, 120 ml. of pyridine and 4 ml. of piperidine was stirred and heated on a steam bath for 75 minutes. The reaction solution was poured into about 600 ml. of water and the mixture was concentrated on a hot plate until solid began to separate. The mixture was allowed to cool to room temperature and the solid was collected, washed with water, and dried. There was obtainend 39.1 g. of pale yellow-grey solid (A), m.p. 265°–70°C. The filtrate and wash were combined, concentrated by boiling until solid began to separate, and allowed to stand overnight. The solid was collected, washed with water, and dried. There was obtained 8.9 g. of pale yellow-grey solid (B), m.p. 270°–3°C. These two crops (A+B, 91%) were combined and dissolved inabout 1.2 liter of acetic acid. The solution was concentrated to about 700 ml. at which point crystals began to separate. The mixture was allowed to cool to room temperature and the solid was collected. There was obtained 41.6 g. (79%) of trans,trans-5-nitro-1,3-benzenediacrylic acid as pale yellow prisms, m.p. 271°–3°C.

The aqueous filtrate from the second crop B was acidified with 6N hydrochloric acid to pH <1. Solid separated and was collected after standing overnight and dried. There was obtained 0.95 g. of pale yellow-grey solid (C).

The aqueous filtrate from C was evaporated under reduced pressure to about 100 ml. and allowed to stand. Solid separated and was collected and dried. There was obtained 6.24 g. (11%) of pale yellow solid (D), m.p. 162°–170°C. The solid D was dissolved in dilute aqueous sodium hydroxide and the pH was adjussted to about 2 with 3N hydrochloric acid. Crystals began to separate and were collected after standing about three hours. There was obtained 4.65 g. of pale yellow solid, m.p. 168°–174°C. After another recrystallization by this method there was obtained 4.00 g. of trans-3-(2-carboxy-1-hydroxyethyl)-5-nitrocinnamic acid as a pale yellow solid, m.p. 174°–179°C. trans-3-(2-Carboxy-1-hydroxyethyl)-5-nitrocinnamic acid when tested by standard in vitro serial dilution procedures was found to be bacteriostatic againt Cl. welchii at a concentration of 0.1 mg./ml., and fungistatic against T. mentagrophytes at a concentration of 1.0 mg./ml.

Further examination of sample C by thin layer chromatography showed the presence of a small quantity of the cis,trans isomer of 5-nitro-1,3-benzenediacrylic acid, prepared in larger amounts by the equilibration reaction described below.

EXAMPLE 2 cis,trans-5-Nitro-1,3-benzenediacrylic acid [Formula B; R' is H, cis,trans isomer]

A solution of 10.0 g. (0.038 mole) of trans,trans-5-nitro-1,3-benzenediacrylic acid in 1.8 liter of methanol was prepared by heating the components in a 2-liter flask. The flask was lightly stoppered and placed by a window for several weeks. The mixture was heated again occasionally when crystals separated in order to maintain a solution. The composition of the solution was determined every several days by thin layer chromatography in a methanol:acetic acid:benzene system (10:10:80) and appeared to become constant when the intensity of the spot corresponding to the trans,trans isomer (Rf 0.45) was slightly greater than the spot corresponding to the cis,trans isomer (Rf 0.42). The mixture was evaporated to dryness under reduced pressure and the residue was dissolved in dilute sodium hydroxide. The solution was heated and 3N hydrochloric acid added dropwise until the pH was about 5.0. Solid separated and was collected after the mixture had cooled to room temperature. There was obtained 2.90 g. of dried pale peach crystals, m.p. 280°–82°C. (dec.). The filtrate was warmed gently and the pH adjusted to about 4.5 with 3N hydrochloric acid. The mixture was allowed to cool and the solid was collected and dried to give 0.95 g. of pale yellow solid, m.p. 260°–70°C. (dec.). Two additional crops were obtained in the same manner by the addition of 3N hydrochloric acid. These crops were 2.50 g. and 1.80 g. of tan solid, m.p. 226°–239°C. (dec.) and 237°–239°C. (dec.), respectively. Thin layer chromatography indicated that the first two crops (total 3.85 g., 38.5%) were mainly the trans,trans isomer, and the third and fourth crops (total 4.30 g., 43%) were mainly the cis,trans isomer. The third and fourth crops were combined and recrystallized twice from acetic acid. The material was then dissolved in dilute sodium hydroxide and precipitated with excess 3N hydrochloric acid. The solid was collected and dried to give cis,trans-5-nitro-1,3-benzenediacrylic acid as very pale yellow crystals, m.p. 247°–249°C. (dec.).

EXAMPLE 3 trans,trans-5-Nitro-1,3-benzenediacrylic acid and 5-nitro-3(2-carboxy-1-ethoxyethyl)cinnamic acid A solution of 17.9 g. (0.100 mole) of 5-nitroisophthalaldehyde, 25 g. (0.24 mole) of malonic acid, 125 ml. of ethanol, and 10 ml. of pyridine was stirred and refluxed on a steam bath for five hours. Solid began to separate from the mixture after about one hour. The mixture was allowed to cool to room temperature. The solid was collected, washed with ethanol, and dried at 60°C. There was obtained 16.3 g. (62%) of pale yellow solid (A), m.p. 258°–268°C. (dec.). The solid was recrystallized from acetic acid and pale yellow prisms, m.p. 269°–271°C. (dec.) were obtained. Admixture with the trans,trans isomer which was obtained in Example 1 gave no depression in melting point.

The filtrate from the crude solid was evaporated to dryness under reduced pressure and an oil was obtained. This oil was dissolved in excess dilute sodium hydroxide. The solution was extracted three times with small volumes of chloroform in order to remove the remaining pyridine. The chloroform was discarded. The aqueous solution was warmed and 3N hydrochloric acid was added slowy until the pH was about 4.5. Solid separated and was collected and dried to give 4.4 g. of yellow solid (B), m.p. 220°–225°C. The filtrate was treated with 3N hydrochloric acid in small portions until the pH was about 4. A yellow oil separated and the aqueous layer was removed by decanatation. A little 3N hydrochloric acid was added to the oil and it solidified. The solid was collected and dried to give 3.90 g. of yellow solid (C), m.p. 120°–130°C. The decanted aqueous layer was acidified with 6N hydrochloric acid to pH about 1. Solid separated and was collected and dried. There was obtained 1.45 g. of colorless solid (D), m.p. 133°–147°C.

The solids C and D were combined (5.35 g., 17%) and recrystallized repeatedly from water-methanol. There was obtained trans-5-nitro-3-(2-carboxy-1-ethoxyethyl)cinnamic acid as colorless prisms, m.p. 145°–149°C.

trans-5-Nitro-3-(2-carboxy-1-ethoxyethyl)cinnamic acid when tested by standard in vitro serial dilution procedures was found to be fungistatic against *T. mentagrophytes* at a concentration of 1.0 mg./ml.

EXAMPLE 4 trans,trans-5-Amino-1,3-benzenediacrylic acid [Formula C; R' is H, trans,trans isomer]

trans,trans-5-Nitro-1,3-benzenediacrylic acid (Example 1) (17.5 g.) was dissolved by warming it in 50 ml. of concentrated ammonium hydroxide and 30 ml. of water, and the solution was added to a hot solution of 120 g. of ferrous sulfate in 150 ml. of water. Additional ammonium hydroxide was added in order to keep the mixture alkaline and the reaction mixture was heated for 35 minutes. The mixture was filtered and the filtrate acidified with acetic acid. The solid product (13.6 g.) was collected and purified by repeated recrystallization from 3N hydrochloric acid. The resulting hydrochloride salt was washed with water which converted the hydrochloride salt to the free amine, trans,trans-5-amino-1,3-benzenediacrylic acid, m.p. above 300°C.

EXAMPLE 5

5-Amino-1,3-benzenedipropionic acid [Formula D; R' is H]

A solution of 14.15 g. of trans,trans-5-nitro-1,3-benzenediacrylic acid (Example 1) in 300 ml. of water containing 4.21 g. of sodium hydroxide was adjusted to pH 7 with acetic acid. The solution was treated with activated charcoal and Raney nickel and filtered, and the filtrate was hydrogenated in the presence of about 0.25 g. of 10% palladium-on-carbon catalyst. After 8 hours the calculated amount of hydrogen had been absorbed, and the reaction mixture was filtered and acidified with acetic acid. The solid product was collected, recrystallized from water and dried in a vacuum oven at 95°C. for 8 hours to give 6.9 g. of 5-amino-1,3-benzenedipropionic acid, cream-colored solid, m.p. 188.5°–189.5°C.

5-Amino-1,3-benzenedipropionic acid can also be prepared by catalytic reduction of trans,trans-5-amino-1,3-benzenediacrylic acid (Example 4).

EXAMPLE 6

5-Acetamido-1,3-benzenedipropionic acid

A mixture of 9.2 g. of 5-amino-1,3-benzenedipropionic acid (Example 5), 20 ml. of acetic acid, 2.8 ml. of acetic anhydride and 1 drop of concentrated sulfuric acid was heated on a steam bath for 30 minutes. The reaction mixture was cooled, ether added, and the solid product collected, recrystallized from waer and dried in vacuo at 60°C. to give 5-acetamido-1,3-benzenedipropionic acid, pale peach solid, m.p. 185°–186°C.

EXAMPLE 7

5-Amino-2,4,6-triido-1,3-benzenedipropionic acid [Formula A; R is $H_2N$, y is $CH_2CH_2$]

To a suspenion of 17.1 g. of 5-amino-1,3-benzenedipropionic acid (Example 5) in 500 ml. of water was slowly added 115 ml. of 2.20M potassium iododichloride, and the reaction mixture was kept for 1 hour at room temperature and then heated for one hour on a steam bath. The reaction mixture was cooled, and the solid product was collected by filtration and dried. The latter material (39.2 g.) was dissolved in dilute sodium hydroxide solution, decolorized with activated charcoal and the solution acidified with hydrochloric acid. The resulting product was dissolved in dimethylformamide, the solution decolorized and filtered and diluted with water. The purification through the sodium salt was repeated to give 19.8 g. of 5-amino-2,4,6-triido-1,3-benzenedipropionic acid. A sample of the acid was dissolvled in methanol and treated with an excess of a solution of sodium hydroxide in methanol. Upon addition of ether there separated 5-amino-2,4,6-triiodo-1,3-benzenedipropionic acid in the form of its disodium salt, pale pink crystals, m.p. 295°–296.5°C. (dec.).

EXAMPLE 8

5-Acetamido-2,4,6-triiodo-1,3-benzenedipropionic acid [Formula A; R is $CH_3CONH$, Y is $CH_2CH_2$]

A mixture of 19.8 g. of 5-amino-2,4,6-triiodo-1,3-benzenedipropionic acid (Example 7), 50 ml. of acetic acid, 5.0 ml. of acetic anhydride and 3 drops of sulfuric acid was warmed at 50°–60°C. for 30 minutes. The reaction mixture was cooled and the solid product collected and washed with water. The latter product was dissolved in dilute sodium hydroxide, and the solution was filtered and acidified. The product was collected and recrystallized from aqueous dimethylformamide to give 5-acetamido-2,4,6-triiodo-1,3-benzenedipropionic acid, m.p. above 260°C. (dec.). A sample of the acid was converted to its disodium salt form, pale pink solid, m.p. above 300°C. by treating a methanol solution of the acid with an excess of sodium hydroxide in methanol and salting the product out with ether.

5-Acetamido-2,4,6-triiodo-1,3-benzenedipropionic acid was found to have intravenous $LD_{50}$ in mice 7,300 ± 724 mg./kg. and a maximum intravenous Cholecystographic Index 2.5 at 100 mg./kg.

EXAMPLE 9

5-Butyramido-2,4,6-triiodo-1,3-benzenedipropionic acid [Formula A; R is $CH_3CH_2CH_2CONH$, Y is $CH_2CH_2$] was prepared from 16 g. of 5-amino-2,4,6- triiodo-1,3-benzenedipropionic acid (Example 7) and butyric anhydride in butyric acid containing a catalytic amount of sulfuric acid, analogous to the procedure described above in Example 8. The reaction mixture was heated for 3 hours at 100°C. and the product isolated and recrystallized from aqueous dimethylformamide to give 13.1 g. of 5-butyramido-2,4,6-triiodo-1,3-benzenedipropionic acid, m.p. 269°-269.5°C. (dec.). A sample of the acid was converted to its disodium salt form, m.p. 290°-298°C. (dec.) when recrystallized from a methanol-ether mixture.

5-Butyramido-2,4,6-triiodo-1,3-benzenedipropionic acid was found to have intravenous $ALD_{50}$ in mice = 3,500 mg./kg. and maximum intravenous Cholecystographic Index 4.0 at 100 mg./kg.

EXAMPLE 10

5-(N-Methylacetamido)-2,4,6-triiodo-1,3-benzenedipropionic acid [Formula A; R is $CH_3CON(CH_3)$, Y is $CH_2CH_2$]

To a solution of 14.0 g. of the disodium salt of 5-acetamido-2,4,6-triiodo-1,3-benzenedipripionic acid (Example 8) in 50 ml. of water, cooled in ice, was added a solution of 2.25 ml. of dimethyl sulfate in 10 ml. of acetone over a period of 15 minutes. The reaction mixture was stirred in an ice bath for 2 hours and then allowed to warm to room temperature. The reaction mixture was kept for 5 hours at room temperature and then acidified with 3N hydrochloric acid. The solid product was collected by filtration, dissolved in ethanol, and the solution was filtered and concentrated to a small volume. Ethyl acetate was added to the solution which caused separation of the product, 5-(N-methylacetamido)-2,4,6-triiodo-1,3-benzenedipropionic acid, colorless prisms, m.p. 236°-239°C.

5-(N-Methylacetamido)-2,4,6-triiodo-1,3-benzenedipropionic acid was found to have intravenous $ALD_{50}$ in mice = 6,000 mg./kg. and maximum intravenous Cholecystographic Index 2.5 at 100 mg./kg.

EXAMPLE 11

5-(N-Methylbutyramido)-2,4,6-triiodo-1,3-benzenedipropionic acid [Formula A; R is $CH_3CH_2CH_2CON(CH_3)$, Y is $CH_2CH_2$] was prepared from 11.6 g. of the disodium salt of 5-butyramido-2,4,6-triiodo-1,3-benzenedipropionic acid (Example 9) and 1.9 ml. of dimethyl sulfate according to the procedure described above in Example 10. The product was recrystallized from ethanol-ethyl acetate to give 5-(N-methylbutyramido)-2,4,6-triiodo-1,3-benzenedipropionic acid, colorless prisms, m.p. 262°-264°C.

5-(N-Methylbutyramido)-2,4,6-triiodo-1,3-benzenedipropionic acid was found to have intravenous $ALD_{50}$ in mice = 3,000 mg./kg. and maximum intravenous Cholecystographic Index 3.0 at 100 mg./kg.

EXAMPLE 12

5-(N-Propylacetamido)-2,4,6-triiodo-1,3-benzenedipropionic acid [Formula A; R is $CH_3CON(C_3H_7)$, Y is $CH_2CH_2$] was prepared from the disodium salt of 5-acetamido-2,4,6-triiodo-1,3-benzenedipropionic acid and propyl iodide according to the procedure described above in Example 10. The product had the m.p. 224°-226.5°C.

5-(N-Propylacetamido)-2,4,6-triiodo-1,3-benzenedipropionic acid was found to have intravenous $ALD_{50}$ = 3,000 mg./kg. in mice and maximum intravenous Cholecystographic Index 4.0 at 100 mg./kg.

EXAMPLE 13

5-(3-Carboxypropionamido)-2,4,6-triiodo-1,3-benzenedipropionic acid [Formula A; R is $HOOCCH_2CH_2CONH$, Y is $CH_2CH_2$]

A mixture of 18.25 g. of 5-amino-2,4,6-triiodo-1,3-benzenedipropionic acid and 100 g. of succinic anhydride was heted to 170°C., then cooled to 125°C. and 1 ml. of concentrated sulfuric acid was added. The reaction mixture was held at 125°C. for 5 minutes, then poured into water and excess sodium hydroxide solution was added. The mixture was stirred until the solid material had dissolved, then acidified with 6N hydrochloric acid and the solid material collected by filtration. The latter material was dissolved in hot dimethylformamide, the solution filtered and acetic acid added to the filtrate. The product which separated was collected and recrystallized from a dimethylformamide-ethyl acetate mixture to give 5-(3-carboxypropionamido)-2,4,6-triiodo-1,3-benzenedipropionic acid, colorless prisms, m.p. 262°-263°C. (dec.).

5-(3-Carboxypropionamido)-2,4,6-triiodo-1,3-benzenedipropionic acid was found to have intravenous $ALD_{50}$ = 5525 mg./kg. and maximum intravenous Cholecystographic Index 2.5 at 100 mg./kg.

If the foregoing reaction is repeated without addition of excess sodium hydroxide solution, there can be obtained 5-succinimido-2,4,6-triiodo-1,3-benzenedipropionic acid [Formula A; R is $(CH_2CO)_2N$, Y is $CH_2CH_2$].

By replacing the succinic anhydride in the foregoing preparation by a molar equivalent amount of glutaric anhydride there can be obtained 5-glutacimido-2,4,6-triiodo-1,3-benzenedipropionic acid [Formula A; R is $CH_2(CH_2CO)_2N$, Y is $CH_2CH_2$], and 5-(4-carboxybutyramido)-2,4,6-triiodo-1,3-benzenedipropionic acid [Formula A; R is $HOOCCH_2CH_2CH_2CONH$, Y is $CH_2CH_2$].

5-(3-Carboxypropionamido)-2,4,6-triiodo-1,3-benzenedipropionic acid can be methylated with dimethyl sulfate according to the procedure of Example 10 to give 5-(N-methyl-3-carboxypropionamido)-2,4,6-triiodo-1,3-benzenedipropionic acid [Formula A; R is $HOOCCH_2CH_2CON(CH_3)$, Y is $CH_2CH_2$].

5-Amino-2,4,6-triiodo-1,3-benzenedipropionic acid can be caused to react with 6-carbomethoxycaproyl chloride to give 5-(6-carbomethoxycaproylamino)-2,4,6-triiodo-1,3-benzenedipropionic acid, and the latter hydrolyzed with dilute sodium hydroxide to give 5-(6-carboxycaproylamino)-2,4,6-triiodo-1,3-benzenedipropionic acid [Formula A; R is $HOOC(CH_2)_5CONH$, Y is $CH_2CH_2$].

EXAMPLE 14

5-Dimethylaminomethyleneamino-2,4,6-triiodo-1,3-benzenedipropionic acid [Formula A; R is $(CH_3)_2NCH=N$, Y is $CH_2CH_2$]

To a solution of 16.1 g. of 5-amino-2,4,6-triiodo-1,3-benzenedipropionic acid in 35 ml. of dimethylformamide was added 17 ml. of chloroform. The mixture was cooled in ice and 4.1 ml. of phosphorus oxychloride in 5 ml. of chloroform was added with stirring over a period of 30 minutes. The mixture was stirred for 90 minutes at room temperature and an additional 1 ml. of phosphorus oxychloride was then added. The reaction mixture was stirred for 2 hours longer, and the solid was collected and washed with acetone. The latter material (13.6 g.) was dissolved in dilute sodium hydroxide, and the solution was filtered and acidified to pH 5.5 with hydrochloric acid. The product was collected and recrystallized from aqueous dimethylformamide to give 10 g. of 5-dimethylaminomethyleneamino-2,4,6-triiodo-1,3-benzenedipropionic acid, m.p. 234°–235°C.

5-Dimethylaminomethyleneamino-2,4,6-triiodo-1,3-benzenedipropionic acid was found to have intravenous $ALD_{50}$ = 1,500 mg./kg. in mice and maximum intravenous Cholecystographic Index 3.5 at 100 mg./kg.

EXAMPLE 15 a. 5-Hydroxy-1,3-benzenedipropionic acid

To a solution of 47.4 g. of 5-amino-1,3-benzenedipropionic acid (Example 5) in 150 ml. of distilled water was added 36 ml. of concentrated sulfuric acid and the solution was cooled to −7°C. A solution of 13.8 g. of sodium nitrite in 50 ml. of water was added in small portions while keeping the temperature at −5°C. The excess nitrite was destroyed by addition of 10% sulfamic acid solution and the reaction mixture was added in small portions over a period of 45 minutes to a mixture of 54 ml. of concentrated sulfuric acid and 50 ml. of water held at 110°C. The reaction mixture was stirred for 45 minutes and kept at about 0°C. for 15 hours. The solid was collected by filtration, the filtrate was extracted with ether, the solid dissolved in the extracts and the solution washed with saturated sodium chloride, dried and concentrated. The residue was recrystallized from an ether-chloroform mixture to give 30.8 g. of 5-hydroxy-1,3-benzenedipropionic acid, m.p. 100°–105.6°C.

b. 5-Hydroxy-2,4,6-triiodo-1,3-benzenedipropionic acid [Formula A; R is HO, Y is $CH_2CH_2$]

To a solution of 11.9 g. of 5-hydroxy-1,3-benzenedipropionic acid in 200 ml. of water was added dropwise a solution of 67.9 ml. of 2.21M potassium iododichloride. The reaction mixture was stirred at room temperature for about 15 hours and then at 90°C. for 3 hours. An additional 7 ml. of potassium iododichloride solution was then added, and the mixture was heated and stirred for 90 minutes. The excess iodine was destroyed with sodium bisulfite and the solid product was collected, washed with water and dried to give 25.5 g. of 5-hydroxy-2,4,6-triiodo-1,3-benzenedipropionic acid, m.p. 237°–238°C. (dec.) when recrystallized repeatedly from dioxane.

5-Hydroxy-2,4,6-triiodo-1,3-benzenedipropionic acid can be caused to react with acetic anhydride or dimethyl sulfate to give, respectively, 5-acetoxy-2,4,6-triiodo-1,3-benzenedipropionic acid [Formula A; R is $CH_3COO$, Y is $CH_2CH_2$] or 5-methoxy-2,4,6-triiodo-1,3-benzenedipropionic acid [Formula A; R is $CH_3O$, Y is $CH_2CH_2$].

EXAMPLE 16

5-Nitro-α,α'-diethyl-1,3-benzenediacrylic acid [Formula B; R' is $C_2H_5$]

A solution of 17.9 g. of 5-nitroisophthalaldehyde, 80 ml. of butyric anhydride, and 25 ml. of triethylamine was stirred and heated for 17 hours on a steam bath. The reaction mixture was poured into aqueous sodium hydroxide and a deep amber solution was obtained. Hydrochloric acid was added slowly with stirring and a brown oily solid separated. The solid was collected, triturated with fresh water, collected again, and dissolved in aqueous sodium hydroxide. The pH of the solution was adjusted to about 6 with dilute hydrochloric acid. Additional dilute hydrochloric acid was added slowly in small portions with stirring until the pH was about 1. Solid separated and was collected in 10 fractions of varying sizes. The fractions were examined by thin layer chromatography. The fourth, fifth and sixth fractions totalled 13.3 g., gave the same spot with thin layer chromatography, had similar m.p.'s (about 219°–225°C.), and were combined and recrystallized from acetic acid. There was obtained pale tan crystals of the trans, trans isomer of 5-nitro-α,α'-diethyl-1,3-benzenediacrylic acid, m.p. 217°, 228°–231°C. (polymorphic).

The eighth and ninth fractions totalled 4.6 g., gave the same spot with thin layer chromatography (slightly more polar than the trans, trans isomer), and had the same m.p. (170°–177°C.). Recrystallization from benzene-ethyl acetate gave pale yellow crystals of the cis, trans isomer of 5-nitro-α,α'-diethyl-1,3-benzenediacrylic acid, m.p. 184.5°–187°C.

EXAMPLE 17 a. 5-Amino-α,α'-diethyl-1,3-benzenediacrylic acid [Formula C; R' is $C_2H_5$, Isomer A] was prepared by reduction of 18.4 g. of 5-nitro-α,α'-diethyl-1,3-benzenediacrylic acid (Example 16, lower melting isomer) with 125 g. of ferrous sulfate in ammonium hydroxide solution according to the procedure described above in Example 4. The product was recrystallized several times from aqueous dimethylformamide to give 5-amino-α,α'-diethyl-1,3-benzenediacrylic acid (Isomer A), pale tan crystals, m.p. 234°–236°C. (dec.).

b. 5-Amino-α,α'-diethyl-1,3-benzenediacrylic acid [Formula C; R' is $C_2H_5$, Isomer B] was prepared by reduction of 35 g. of 5-nitro-α,α'-diethyl-1,3-benzenediacrylic acid (Example 16, higher melting isomer) with ferrous sulfate according to the procedure described above in Example 4. The product was recrystallized from aqueous ethanol to give 5-amino-α,α'-diethyl-1,3-benzenediacrylic acid (Isomer B), pale tan prisms, m.p. 232°–234°C.

EXAMPLE 18

5-Acetamido-α,α'-diethyl-1,3-benzenediacrylic acid [Formula E; R is $CH_3CONH$, Y is $CH=C(C_2H_5)$]

A mixture of 3.0 g. of 5-amino-α,α'-diethyl-1,3-benzenediacrylic acid (Isomer B, Example 17b), 3 ml. of acetic anhydride, 20 ml. of acetic acid and 2 drops of concentrated sulfuric acid was warmed at 50°–60°C. for 30 minutes. The solid product was collected, washed with ether and recrystallized repeatedly from aqueous dimethylformamide to give 5-acetamido-α,α'-diethyl-1,3-benzenediacrylic acid, pale yellow prisms, m.p. 273°–278°C.

5-Acetamido-α,α'-diethyl-1,3-benzenediacrylic acid was found to have in vitro bacteriostatic activity against E. typhi Hopkins, Cl, welchii M, and Ps. aeruginosa 211 at a concentration of 1 mg./ml. and against Strep. sp. HS–6 at 0.75 mg./ml.

EXAMPLE 19 a. 5-Amino-2,4,6-triiodo-α,α'-diethyl-1,3-benzenediacrylic acid [Formula A; R is $H_2N$, Y is $CH=C(C_2H_5)$, Isomer A] was prepared by iodination of 5-amino-α,α'-diethyl-1,3-benzenediacrylic acid (Isomer A, Example 17a) with potassium iododichloride according to the procedure described above in Example 7. The product was recrystallized from an ethyl acetate-ethanol mixture and converted to its disodium salt form which had the m.p. above 300°C. when recrystallized from a methanol-isopropyl alcohol mixture.

b. 5-Amino-2,4,6-triiodo-$\alpha,\alpha'$-diethyl-1,3-benzenediacrylic acid [Formula A; R is $H_2N$, Y is $CH=C(C_2H_5)$, Isomer B] was prepared by iodination of 5-amino-$\alpha,\alpha'$-diethyl-1,3-benzenediacrylic acid (Isomer B, Example 17b) with potassium iododichloride according to the procedure described above in Example 7. The product was recrystallized repeatedly from aqueous dimethylformamide to give 5-amino-2,4,6-triiodo-$\alpha,\alpha'$-diethyl-1,3-benzenediacrylic acid, m.p. 267°–268°C. (dec.). A sample of the acid was converted to its disodium salt form with sodium hydroxide in methanol solution. The disodium salt was recrystallized by dissolving it in water and salting it out with acetone, and was obtained in the form of pale yellow crystals, m.p. above 300°C.

EXAMPLE 20

5-Acetamido-2,4,6-triiodo-$\alpha,\alpha'$-diethyl-1,3-benzenediacrylic acid [Formula A; R is $CH_3CONH$, Y is $CH=C(C_2H_5)$]

A mixture of 9.8 g. of 5-amino-2,4,6-triiodo-$\alpha,\alpha'$-diethyl-1,3-benzenediacrylic acid (Isomer B, Example 19b), 3 ml. of acetic anhydride, 30 ml. of acetic acid and 5 drops of sulfuric acid was heated at 50°–60°C. for 35 minutes. Water (80 ml.) was slowly added and the solution was then cooled and 10 ml. of acetic acid was added. The solid product was collected and recrystallized repeatedly from aqueous acetic acid to give 5-acetamido-2,4,6-triiodo-$\alpha,\alpha'$-diethyl-1,3-benzenediacrylic acid, m.p. 251°–252°C. A sample of the acid was converted to its disodium salt which was recrystallized from a methanol-isopropyl alcohol mixture.

5-Acetamido-2,4,6-triiodo-$\alpha,\alpha'$-diethyl-1,3-benzenediacrylic acid was found to have intravenous $ALD_{50} = 6000$ mg./kg. in mice and maximum intravenous Cholecystographic Index 3.0 at 100 mg./kg.

EXAMPLE 21 a. 5-Amino-$\alpha,\alpha'$-diethyl-1,3-benzenedipropionic acid [Formula D; R' is $C_2H_5$]

To a solution of 12.8 g. of 5-nitro-$\alpha,\alpha'$-diethyl-1,3-benzenediacrylic acid (Example 16, higher melting isomer) in 300 ml. of dilute ammonium hydroxide was added 0.5 g. of 10% palladium-on-carbon catalyst, and the mixture was hydrogenated until the calculated amount of hydrogen had been absorbed. The catalyst was removed by filtration, and the filtrate containing 5-amino-$\alpha,\alpha'$-diethyl-1,3-benzenedipropionic acid was iodinated according to the following procedure.

b. 5-Amino-2,4,6-triiodo-$\alpha,\alpha'$-diethyl-1,3-benzenedipropionic acid [Formula A; R is $H_2N$, Y is $CH_2CH(C_2H_5)$]

The solution from the foregoing reduction in part (a) was added dropwise over a period of 30 minutes to a stirred mixture of 250 ml. of water, 60 ml. of 2.25N potassium iododichloride and 12 ml. of 3N hydrochloric acid in an ice bath. The mixture was stirred for one hour in the ice bath and then for about 15 hours at room temperature. The solid material which had formed was collected, dissolved in 300 ml. of dilute sodium hydroxide and added dropwise to a stirred mixture of 250 ml. of water, 15 ml. of 2.25N potassium iododichloride and 25 ml. of 6N hydrochloric acid in an ice bath. The mixture was stirred for one hour in the ice bath and for two hours at room temperature. Sodium bisulfate was added to the reaction mixture and the solid collected and dried to give 23.3 g. of pink-brown solid. Fractional crystallization of the product from methanol-ethyl acetate led to the isolation of two products which were identified as the two dl pairs of 5-amino-2,4,6-triiodo-$\alpha,\alpha'$-diethyl-1,3-benzenedipropionic acid. The least soluble product (Isomer A) was obtained as yellow crystals, m.p. 220°–222°C. The sodium salt was made from Isomer A and had m.p. 245°–6°C.

The more soluble isomer (Isomer B) was isolated as yellow crystals, m.p. 217°–220°C. Admixture of the two isomers gave m.p. 202°–210°C. The sodium salt was prepared from the B Isomer and gave m.p. 265°–7°C.

EXAMPLE 22

5-Acetamido-2,4,6-triiodo-$\alpha,\alpha'$-diethyl-1,3-benzenedipropionic acid [Formula A; R is $CH_3CONH$, Y is $CH_2CH(C_2H_5)$, Isomer A] was prepared by acetylation of 5-amino-2,4,6-triiodo-$\alpha,\alpha'$-diethyl-1,3-benzenedipropionic acid (Example 21b, Isomer A) with acetic anhydride in acetic acid according to the procedure of Example 8. The product was recrystallized from a methanol-ethyl acetate mixture and from acetic acid and obtained in the form of colorless crystals, m.p. 228°–230°C.

5-Acetamido-2,4,6-triiodo-$\alpha,\alpha'$-diethyl-1,3-benzenedipropionic acid was found to have intravenous $ALD_{50} = 4000$ mg./kg. in mice and maximum intravenous cholecystographic index 2.5 at 100 mg./kg.

EXAMPLE 23

5-Hydroxy-$\alpha,\alpha'$-diethyl-1,3-benzenediacrylic acid [Formula E; R is HO, Y is $CH=C(C_2H_5)$] can be prepared by diazotization and hydrolysis of 5-amino-$\alpha,\alpha'$-diethyl-1,3-benzenediacrylic acid (Example 17b) according to the procedure described above in Example 15. The 5-hydroxy-$\alpha,\alpha'$-diethyl-1,3-benzenediacrylic acid can then be iodinated with potassium iododichloride according to the standard procedure as described in Example 15b to give 5-hydroxy-2,4,6-triiodo-$\alpha,\alpha'$-diethyl-1,3-benzenediacrylic acid [Formula A; R is HO, Y is $CH=C(C_2H_5)$].

EXAMPLE 24

5-Nitro-$\alpha,\alpha'$-dibutyl-1,3-benzenediacrylic acid [Formula B; R' is $C_4H_9$] was prepared from 50.0 g. of 5-nitroisophthalaldehyde, 400 ml. of hexanoic anhydride and 95 ml. of triethylamine according to the procedure described above in Example 16. The product was steam distilled and the residue crystallized from ethyl acetate to give 5-nitro-$\alpha,\alpha'$-dibutyl-1,3-benzenediacrylic acid (Isomer A), light tan crystals, m.p. 199.5°–202°C. The ethyl acetate mother liquors were concentrated to dryness and the residue treated with warm benzene. The benzene soluble fraction was obtained by evaporation of the solvent, and the residue was recrystallized from benzene and from a benzene-hexane mixture to give 5-nitro-$\alpha,\alpha'$-dibutyl-1,3-benzenediacrylic acid (Isomer B), pale yellow prisms, m.p. 143°–145°C.

EXAMPLE 25

5-Amino-$\alpha,\alpha'$-dibutyl-1,3-benzenediacrylic acid [Formula C; R' is $C_4H_9$, Isomer A] was prepared by reducing 5-nitro-$\alpha,\alpha'$-dibutyl-1,3-benzenediacrylic acid (Isomer A, Example 24) with ferrous sulfate in ammonium hydroxide according to the procedure described above in Example 4. The product was recrystallized from aqueous methanol and obtained in the form of pale yellow prisms, m.p. 183°–184.5°C.

EXAMPLE 26

5-Amino-2,4,6-triiodo-$\alpha,\alpha'$-dibutyl-1,3-benzenediacrylic acid [Formula A; R is H$_2$N, Y is CH=C(C$_4$H$_9$), Isomer A] was prepared by iodination of 5-amino-$\alpha,\alpha'$-dibutyl-1,3-benzenediacrylic acid (Isomer A, Example 25) with potassium iododichloride according to the procedure described above in Example 7. The free acid was recrystallized from an ethyl acetate-ethanol mixture and had the m.p. 260°–261°C. A sample of the free acid was dissolved in aqueous sodium hydroxide, the pH adjusted to 7 with dilute acid, the solution filtered, the filtrate warmed, saturated sodium chloride solution added and the solution cooled. The solid which separated was collected and recrystallized from a methanol-ether mixture to give 5-amino-2,4,6-triiodo-$\alpha,\alpha'$-dibutyl-1,3-benzenediacrylic acid in the form of its disodium salt, m.p. above 300°C.

EXAMPLE 27

5-Acetamido-2,4,6-triiodo-$\alpha,\alpha'$-dibutyl-1,3-benzenediacrylic acid [Formula A; R is CH$_3$CONH, Y is CH=C(C$_4$H$_9$), Isomer A] was prepared by acetylation of 5-amino-2,4,6-triiodo-$\alpha,\alpha'$-dibutyl-1,3-benzenediacrylic acid (Isomer A, Example 26) with acetic anhydride in acetic acid according to the procedure of Example 8. The product was recrystallized from ethyl acetate and from an ethyl acetate-ethanol mixture and obtained in the form of colorless fine prisms, m.p. 271°–272°C. (dec.).

5-Acetamido-2,4,6-triiodo-$\alpha,\alpha'$-dibutyl-1,3-benzenediacrylic acid was found to have maximum intravenous Cholecystographic Index 4.0 at 100 mg./kg.

EXAMPLE 28

5-Nitro-$\alpha,\alpha'$-diphenyl-1,3-benzenediacrylic acid [Formula B; R' is C$_6$H$_5$].

A mixture of 35.8 g. of 5-nitroisophthalaldehyde, 60 g. of phenylacetic acid, 120 ml. of acetic anhydride and 55 ml. of triethylamine was stirred and heated on a steam bath for 14 hours. The reaction mixture was cooled, poured into dilute sodium hydroxide solution, filtered and acidified. A gum and some solid separated. The aqueous layer was removed by decantation, the gum was triturated a number of times with fresh water, and it solidified. The solidified gum and the solid were dissolved in aqueous sodium hydroxide and the solution was acidified. A solid separated and was collected and dried to give 75.1 g. of yellow solid, m.p. 150°–230°C. Fractional crystallization from ethanol, ethanol-benzene, and ethyl acetate-benzene gave three geometric isomers of 5-nitro-$\alpha,\alpha'$-diphenyl-1,3-benzenediacrylic acid. The preponderanat and least soluble product was identified as the trans, trans isomer and was obtained as pale yellow prisms, m.p. 284°–5°C. The next least soluble product was identified as the cis, trans isomer and was obtained as pale yellow prisms, m.p. 189°–190°C. The most soluble product was identified as the cis, cis isomer and was obtained as pale yellow prisms, m.p. 149°–151°C. and 167°–171°C. (polymorphic).

EXAMPLE 29 trans,trans-5-Amino-$\alpha,\alpha'$-diphenyl-1,3-benzenediacrylic acid [Formula C; R' is C$_6$H$_5$, trans, trans isomer], yellow prisms, m.p. 250°–253°C. (from ethanol); and cis,trans-5-Amino-$\alpha,\alpha'$-diphenyl-1,3-benzenediacrylic acid [Formula C; R' is C$_6$H$_5$, cis, trans isomer], pale yellow prisms, m.p. 230°–232°C. (dec.) (from ethanol) were prepared by reduction of trans,trans-5-nitro-$\alpha,\alpha'$-diphenyl-1,3-benzenediacrylic acid and cis,trans-5-nitro-$\alpha,\alpha'$-diphenyl-1,3-benzenediacrylic acid (Example 28), respectively, with ferrous sulfate in ammonium hydroxide solution according to the procedure of Example 4.

EXAMPLE 30

5-Amino-$\alpha,\alpha'$-diphenyl-1,3-benzenedipropionic acid [Formula D; R' is C$_6$H$_5$].

A solution of 12.45 g. of trans,trans-5-nitro-$\alpha,\alpha'$-diphenyl-1,3-benzenediacrylic acid (Example 28) in warm dilute sodium hydroxide was treated twice with Raney nickel catalyst. Fresh catalyst was added and the mixture was hydrogenated. When hydrogenation was complete, the catalyst was removed by filtration and acetic acid was added to the filtrate. The solid product was collected, dissolved in ethyl acetate and the solution filtered. Benzene was added to the filtrate and the solution evaporated to dryness. The residue was recrystallized from an ethyl acetate-benzene mixture to give 5-amino-$\alpha,\alpha'$-diphenyl-1,3-benzenedipropionic acid, pale tan crystals, m.p. 130°–140°C.

EXAMPLE 31 trans,trans-5-Amino-2,4,6-triiodo-$\alpha,\alpha'$-diphenyl-1,3-benzenediacrylic acid [Formula A; R is H$_2$N, Y is CH=C(C$_6$H$_5$), trans, trans isomer] was prepared by iodination of trans,trans-5-amino-$\alpha,\alpha'$-diphenyl-1,3-benzenediacrylic acid (Example 29) with potassium iododichloride according to the procedure of Example 7. The free acid was recrystallized from an ethyl acetate-ethanol mixture and a dimethylformamide-ethanol mixture and had m.p. above 300°C. A sample of the free acid was converted to its disodium salt, m.p. above 300°C. when recrystallized from a methanol-ether mixture.

trans,trans-5-Amino-2,4,6-triiodo-$\alpha,\alpha'$-diphenyl-1,3-benzenediacrylic acid can be acetylated with acetic anhydride in acetic acid according to the procedure of Example 8 to give trans,trans-5-acetamido-2,4,6-triiodo-$\alpha,\alpha'$-diphenyl-1,3-benzenediacrylic acid [Formula A; R is CH$_3$CONH, Y is CH$_2$C(C$_6$H$_5$)].

EXAMPLE 32 cis,trans-5-Amino-2,4,6-triiodo-$\alpha,\alpha'$-diphenyl-1,3-benzenediacrylic acid [Formula A; R is H$_2$N, Y is CH=C(C$_6$H$_5$), cis, trans isomer] was prepared by iodination of cis,trans-5-amino-$\alpha,\alpha'$-diphenyl-1,3-benzenediacrylic acid (Example 29) with potassium iododichloride according to the procedure of Example 7. The free acid was recrystallized repeatedly from an ethanol-ethyl acetate mixture and had the m.p. 278°–280°C. (dec.). A sample of the free acid was converted to its disodium salt form which was obtained as a colorless solid, m.p. 267°–271°C. (dec.) when recrystallized from water and from methanol-ether.

cis,trans-5-Amino-2,4,6-triiodo-$\alpha,\alpha'$-diphenyl-1,3-benzenediacrylic acid can be acetylated with acetic anhydride in acetic acid according to the procedure of Example 8 to give cis,trans-5-acetamido-2,4,6-triiodo-$\alpha,\alpha'$-diphenyl-1,3-benzenediacrylic acid [Formula A; R is CH$_3$CONH, Y is CH=C(C$_6$H$_5$)].

EXAMPLE 33

5-Amino2,4,6-triiodo-α,α'-diphenyl-1,3-benzenedipropionic acid [Formula A; R is H₂N, Y is CH₂CH(C₆H₅)]

A solution of 13.65 g. of 5-amino-α,α'-diphenyl-1,3-benzenedipropionic acid in 800 ml. of water and 15 ml. of 6N hydrochloric acid was prepared by heating on a steam bath and stirring. The solution was cooled in an ice bath and 54 ml. of 2.2N potassium iododichloride was added slowly and solid separated. The mixture was stirred for 1 hour in the ice bath, 20 hours at room temperature, and finally 4 hours at 50°C. Sodium bisulfite solution was added and the product was collected and dried to give 24.9 g. This product was separated into the two dl pairs which are theoretically possible. Solution of the product in warm aqueous sodium hydroxide followed by the addition of saturated sodium chloride and cooling precipitated one component (Isomer A) as its sodium salt. The other component (Isomer B) was precipitated by the addition of dilute hydrochloric acid to the filtrate. Both isomers were recrystallized as the free acids from methanol-ethyl acetate. The Isomer A gave m.p. 236°–8°C. (dec.) and the Isomer B gave m.p. 245°–7°C. (dec.). The sodium salts were prepared in usual manner and gave m.p. of 274°–6°C. (dec.) and 282°–4°C. (dec.), respectively.

EXAMPLE 34

5-Acetamido-2,4,6-triiodo-α,α'-diphenyl-1,3-benzenedipropionic acid [Formula A; R is CH₃CONH, Y is CH₂CH(C₆H₅), Isomer B] was prepared by acetylation of 5-amino-2,4,6-triiodo-α,α'-diphenyl-1,3-benzenedipropionic acid (Isomer B, Example 33) with acetic anhydride in acetic acid according to the procedure of Example 8. The free acid was recrystallized from an isopropyl alcohol-ethyl acetate mixture and was obtained as colorless crystals, m.p. 262°–264°C.

5-Acetamido-2,4,6-triiodo-α,α'-diphenyl-1,3-benzenedipropionic acid was found to have intravenous ALD₅₀ in mice 3000 mg./kg. and maximum intravenous Cholecystographic Index 4.0 at 100 mg./kg.

EXAMPLE 35

5-Hydroxy-α,α'-diphenyl-1,3-benzenedipropionic acid [Formula E; R is HO, Y is CH₂CH(C₆H₅)] can be prepared by diazotization and hydrolysis of 5-amino-α,α'-diphenyl-1,3-benzenedipropionic acid (Example 30) according to the procedure of Example 15. The 5-hydroxy-α,α'-diphenyl-1,3-benzenedipropionic acid can then be iodinated with potassium iododichloride according to the procedure of Example 15, part (b) to give 5-hydroxy-2,4,6-triiodo-α,α'-diphenyl-1,3-benzenedipropionic acid [Formula A; R is HO, Y is CH₂CH(C₆H₅)].

I claim:
1. A compound of the formula

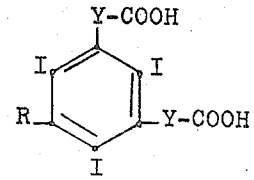

wherein R is H₂N, (lower-alkanoyl)NH, (lower-alkanoyl)N(lower-alkyl), (carboxy-lower-alkanoyl)NH, (carboxy-lower-alkanoyl)N(lower-alkyl), (lower-alkyl)₂NCH=N, HO, (lower-alkanoyl)O, or (lower-alkyl)O; and Y is —CH=C(R')— or —CH₂-CH(R')—, wherein R' is hydrogen, lower-alkyl or phenyl.

2. A compound according to claim 1 wherein Y is —CH=C(R')—.

3. A compound according to claim 1 wherein Y is —CH₂-CH(R')—.

4. A compound according to claim 2 wherein R is H₂N.

5. A compound according to claim 3 wherein R is H₂N.

6. 5-Butyramido-2,4,6-triiodo-1,3-benzenedipropionic acid, according to claim 3 wherein R is butyramido and R' is hydrogen.

7. 5-(N-Propylacetamido)-2,4,6-triiodo-1,3-benzenedipropionic acid, according to claim 3 wherein R is N-propylacetamido and R' is hydrogen.

8. 5-Acetamido-2,4,6-triiodo-α,α'-diphenyl-1,3-benzenedipropionic acid, according to claim 3 wherein R is acetamido and R' is phenyl.

9. 5-Acetamido-2,4,6-triiodo-α,α'-diethyl-1,3-benzenediacrylic acid, according to claim 2 wherein R is acetamido and R' is ethyl.

10. 5-Acetamido-2,4,6-triiodo-α,α'-dibutyl-1,3-benzenediacrylic acid, according to claim 2 wherein R is acetamido and R' is butyl.

11. A compound of the formula

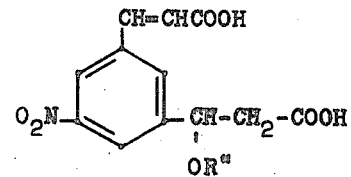

wherein R" is hydrogen or lower-alkyl.

12. 3-(2-Carboxy-1-hydroxyethyl)-5-nitrocinnamic acid, according to claim 11 wherein R" is hydrogen.

13. 3-(2-Carboxy-1-ethoxyethyl)-5-nitrocinnamic acid, according to claim 11 wherein R" is ethyl.

* * * * *

UNITED STATES PATENT OFFICE
CERTIFICATE OF CORRECTION

PATENT NO. : 3,856,853
DATED : December 24, 1974
INVENTOR(S) : James H. Ackerman It is certified that error appears in the above-identified patent and that said Letters Patent are hereby corrected as shown below:

Cover page [75], "Bethleham" should read --Bethlehem--.

Column 2, lines 9-10, delete "-benzenedipropionic" and insert in place thereof --from--.

Column 3, line 58, "rous" should read --rus--.

Column 5, line 11, "designed" should read --designated--.

Signed and Sealed this sixteenth Day of September 1975

[SEAL]

Attest:

RUTH C. MASON
Attesting Officer

C. MARSHALL DANN
Commissioner of Patents and Trademarks